US012766993B2

(12) United States Patent
Park

(10) Patent No.: US 12,766,993 B2

(45) Date of Patent: Oct. 20, 2026

(54) AI-BASED DYNAMIC PRICING SYSTEM FOR ELECTRIC VEHICLE CHARGING STATIONS

(71) Applicant: SOFTBERRY CO., LTD., Jeju-si (KR)

(72) Inventor: Yong Hee Park, Yongin-si (KR)

(73) Assignee: SOFTBERRY CO., LTD., Jeju-si (KR)

( * ) Notice: Subject to any disclaimer, the term of this patent is extended or adjusted under 35 U.S.C. 154(b) by 0 days.

(21) Appl. No.: 18/560,936

(22) PCT Filed: Sep. 18, 2023

(86) PCT No.: PCT/KR2023/014090

§ 371 (c)(1),
(2) Date: Nov. 27, 2024

(87) PCT Pub. No.: WO2024/080601

PCT Pub. Date: Apr. 18, 2024

(65) Prior Publication Data

US 2025/0326320 A1 Oct. 23, 2025

(30) Foreign Application Priority Data

Oct. 12, 2022 (KR) ........................ 10-2022-0130743

(51) Int. Cl.
*B60L 53/66* (2019.01)
*B60L 53/68* (2019.01)
(Continued)

(52) U.S. Cl.
CPC ............. *B60L 53/665* (2019.02); *B60L 53/68* (2019.02); *G06Q 10/02* (2013.01); *G06Q 30/0283* (2013.01)

(58) Field of Classification Search
None
See application file for complete search history.

(56) References Cited

U.S. PATENT DOCUMENTS

2019/0130318 A1* 5/2019 Lee .......................... B60L 53/11
2020/0111175 A1* 4/2020 Uyeki .............. G06Q 10/06312
(Continued)

FOREIGN PATENT DOCUMENTS

KR 10-2019-0134881 A 12/2019
KR 20190134881 A * 12/2019 .............. B60L 53/68
KR 10-2021-0118990 A 10/2021

OTHER PUBLICATIONS

Hecht et al.; "Analysis of Electric Vehicle Charging Station Usage and Profitability in Germany based on Empirical Data"; ArXiv; https://arxiv.org/abs/2206.09582 (Year: 2022).*

*Primary Examiner* — Jeff Zimmerman
*Assistant Examiner* — Jorge G Del Toro-Ortega
(74) *Attorney, Agent, or Firm* — Revolution IP, PLLC

(57) ABSTRACT

An AI-based dynamic pricing system for an electric vehicle charging station is disclosed. The AI-based dynamic pricing system includes: a user terminal being carried by a user who is driving an electric vehicle, and searching electric vehicle charging stations and making an electric vehicle charging reservation request; an electric vehicle charging payment terminal performing payment when electric vehicle charging corresponding to the electric vehicle charging reservation requested from the user terminal is performed; an electric vehicle charging adjustment server performing adjustment with the electric vehicle charging station on the basis of payment that is performed in the electric vehicle charging payment terminal; and an electric vehicle charging station terminal looking up and checking an electric vehicle charging reservation at an electric vehicle charging station, wherein the electric vehicle charging adjustment server is configured to determine an electric vehicle charging price of each electric vehicle charging station. According to the AI-based dynamic pricing system for an electric vehicle charging station, since it is configured to automatically (Continued)

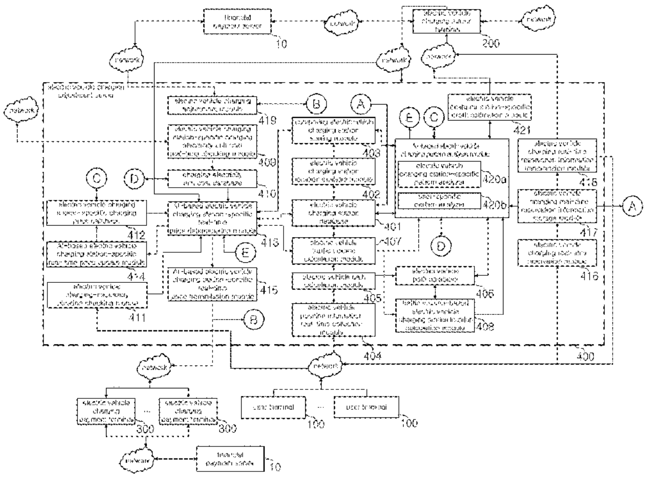

adjust an electric vehicle charging price by an AI algorithm in real time in consideration of a path of an electric vehicle, a traffic volume, a real-time reservation situation, a location, the charging prices of competing charging stations, whereby there is an effect that it is possible to maximize the profit of electric vehicle charging stations and increase satisfaction of users.

2 Claims, 1 Drawing Sheet

(51) Int. Cl.
*G06Q 10/02* (2012.01)
*G06Q 30/0283* (2023.01)

(56) References Cited

U.S. PATENT DOCUMENTS

| | | | | |
|---|---|---|---|---|
| 2020/0294078 | A1 * | 9/2020 | Hu | G06Q 30/0237 |
| 2024/0059170 | A1 * | 2/2024 | Khamis | B60L 53/62 |
| 2024/0222971 | A1 * | 7/2024 | Wolfe | B60L 53/30 |

* cited by examiner

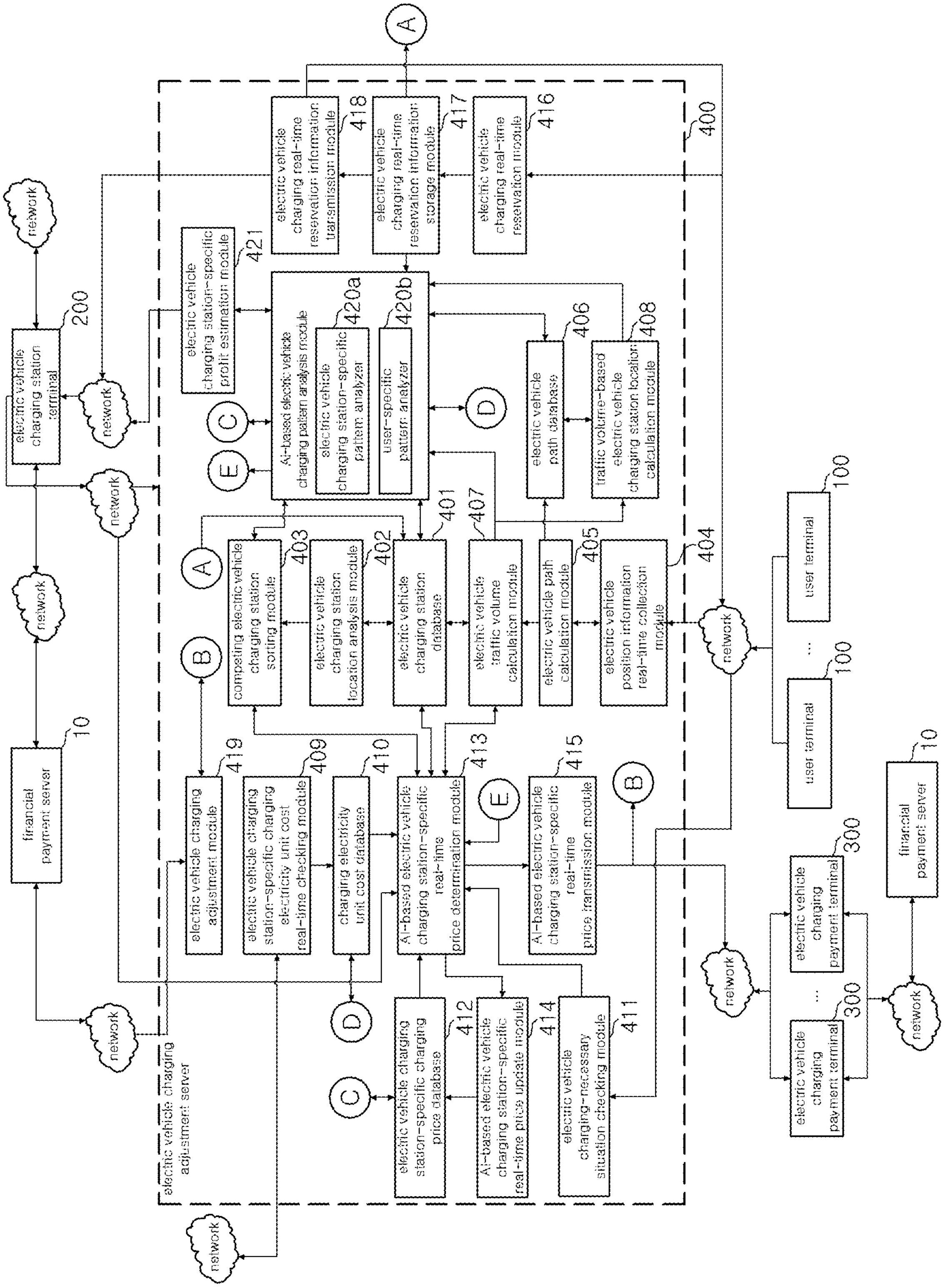
financial payment server
10
electric vehicle charging station terminal
200
network
electric vehicle charging adjustment server
400
electric vehicle charging real-time reservation information transmission module
418
electric vehicle charging real-time reservation information storage module
417
electric vehicle charging real-time reservation module
416
electric vehicle charging station-specific profit estimation module
421
AI-based electric vehicle charging pattern analysis module
electric vehicle charging station-specific pattern analyzer
420a
user-specific pattern analyzer
420b
electric vehicle path database
406
traffic volume-based electric vehicle charging station location calculation module
408
competing electric vehicle charging station sorting module
403
electric vehicle charging station location analysis module
402
electric vehicle charging station database
401
electric vehicle traffic volume calculation module
407
electric vehicle path calculation module
405
electric vehicle position information real-time collection module
404
electric vehicle charging adjustment module
419
electric vehicle charging station-specific charging electricity unit cost real-time checking module
409
charging electricity unit cost database
410
AI-based electric vehicle charging station-specific real-time price determination module
413
AI-based electric vehicle charging station-specific real-time price transmission module
415
electric vehicle charging station-specific charging price database
412
AI-based electric vehicle charging station-specific real-time price update module
414
electric vehicle charging-necessary situation checking module
411
user terminal
100
electric vehicle charging payment terminal
300
A
B
C
D
E

AI-BASED DYNAMIC PRICING SYSTEM FOR ELECTRIC VEHICLE CHARGING STATIONS

CROSS-REFERENCE TO RELATED APPLICATIONS

This application is the National Stage filing under 35 U.S.C. 371 of International Application No. PCT/KR2023/014090, filed on Sep. 18, 2023, which claims the benefit of Korean Patent Application No. 10-2022-0130743, filed on Oct. 12, 2022, the contents of which are all hereby incorporated by reference herein in their entirety.

TECHNICAL FIELD

The present disclosure relates to a charging prices determination algorithm of an electric vehicle charging station and, in detail, an AI-based dynamic pricing system for an electric vehicle charging station.

BACKGROUND ART

As more electrical vehicles are popularized, electric vehicle charging stations are also on a rapidly increasing trend. Since it takes long time to charge electric vehicles in comparison to filling vehicles with oil, a charging standby time or whether various subsidiary facilities are provided has a great influence on selection of charging stations.

Electric vehicle charging stations, similar to gas stations, fix different electric vehicle charging prices at respective charging stations. Some of users of electric vehicles prefer electric vehicle charging stations with lower prices and some prefer electric vehicle charging stations equipped with various subsidiary facilities.

Users search and go to electric vehicle charging stations and use even a payment service for charging using electric vehicle charging search and payment Apps such as EV Infra.

Electric vehicle charging stations, as a bottleneck, have great difficulty in setting an appropriate charging price that can induce users of electric vehicles to come to charge. There is a problem that when the charging price is too high, customers may be taken by competing charging stations, and when the price is recklessly set low, the profit becomes too low.

It is difficult to monitor the charging prices of all of other electric vehicle charging stations and it is also more difficult to determine an appropriate charging price that can maximize a profit.

Accordingly, there is an increasing need for a solution for setting and adjusting charging prices of electric vehicle charging stations.

DISCLOSURE

Technical Problem

An objective of the present disclosure is to provide an AI-based dynamic pricing system for an electric vehicle charging station.

Technical Solution

An AI-based dynamic pricing system for an electric vehicle charging station according to the objectives of the present disclosure described above may be configured to include: a user terminal being carried by a user who is driving an electric vehicle, and searching electric vehicle charging stations and making an electric vehicle charging reservation request; an electric vehicle charging payment terminal performing payment when electric vehicle charging corresponding to the electric vehicle charging reservation requested from the user terminal is performed; and an electric vehicle charging adjustment server performing adjustment with the electric vehicle charging station on the basis of payment that is performed in the electric vehicle charging payment terminal.

In this configuration, the electric vehicle charging adjustment server may be configured to determine an electric vehicle charging price of each electric vehicle charging station.

Further, the AI-based dynamic pricing system may be configured to further include an electric vehicle charging station terminal looking up and checking an electric vehicle charging reservation at an electric vehicle charging station.

Advantageous Effects

According to the AI-based dynamic pricing system for an electric vehicle charging station, since it is configured to automatically adjust an electric vehicle charging price by an AI algorithm in real time in consideration of a path of an electric vehicle, a traffic volume, a real-time reservation situation, a location, the charging prices of competing charging stations, whereby there is an effect that it is possible to maximize the profit of electric vehicle charging stations and increase satisfaction of users.

DESCRIPTION OF DRAWINGS

FIG. 1 is a block configuration diagram of an AI-based dynamic pricing system for an electric vehicle charging station according to an embodiment of the present disclosure.

BEST MODE FOR INVENTION

The present disclosure may be modified in various ways and implemented by various exemplary embodiments, so that specific exemplary embodiments are shown in the drawings and will be described in detail in the detailed description for implementing the present disclosure. However, it is to be understood that the present disclosure is not limited to the specific exemplary embodiments, but includes all modifications, equivalents, and substitutions included in the spirit and the scope of the present disclosure. Similar reference numerals are assigned to similar components in the following description of drawings.

Terms used in the specification, 'first', 'second', 'A', 'B', etc., may be used to describe various components, but the components are not to be construed as being limited to the terms. The terms are used only to distinguish one component from another component. For example, the first component may be named the second component, and vice versa, without departing from the scope of the present disclosure. The term 'and/or' includes a combination of a plurality of relevant items or any one of a plurality of relevant terms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

The terms used herein are used only for the purpose of describing particular embodiments and are not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms have the same meanings as those that are understood by those who skilled in the art. It will be further understood that terms defined in dictionaries that are commonly used should be interpreted as having meanings that are consistent with their meanings in the context of the relevant art and will not be interpreted in an idealized or overly formal sense unless expressly so defined herein.

Hereinafter, preferred embodiments of the present disclosure will be described in detail with reference to the accompanying drawings.

FIG. 1 is a block configuration diagram of an AI-based dynamic pricing system for an electric vehicle charging station according to an embodiment of the present disclosure.

Referring to FIG. 1, an AI-based dynamic pricing system for an electric vehicle charging station according to an embodiment of the present disclosure may be configured to include a user terminal 100, an electric vehicle charging station terminal 200, an electric vehicle charging payment terminal 300, and an electric vehicle charging adjustment server 400.

Hereafter, detailed configuration is described.

The user terminal 100 may be configured to be carried by a user who is driving an electric vehicle and to search electric vehicle charging stations and make an electric vehicle charging reservation request to the electric vehicle charging adjustment server 400. For example, a user can use services for not only electric vehicle charging reservation, but payment by installing Apps such as EV Infra in the user terminal 100.

The electric vehicle charging station terminal 200 may be configured to look up and check an electric vehicle charging reservation through the electric vehicle charging adjustment server 400 at an electric vehicle charging station.

Further, the electric vehicle charging station terminal 200 may be configured to update information, such as opening hours, an electric vehicle charging type, the number of electric vehicle chargers, the number of electric vehicle chargers that are currently charging, a reservation situation of each electric vehicle charger, an available reservation time of each electric vehicle charger, breakdown information of electric vehicle chargers, whether various subsidiary facilities for convenience for users are available, and whether parking is possible, in real time to the electric vehicle charging adjustment server 400.

Meanwhile, the electric vehicle charging station terminal 200 may be configured to manually receive an electric vehicle charging price and transmit the electric vehicle charging price to the electric vehicle charging adjustment server 400. The electric vehicle charging adjustment server 400 can set first an electric vehicle charging price set by the electric vehicle charging station terminal 200.

The electric vehicle charging payment terminal 300 is provided at an electric vehicle charging station and may be configured to perform payment when an electric vehicle is charged. The electric vehicle charging payment terminal 300 may be provided for each electric vehicle charger of an electric vehicle charging station. The electric vehicle charging payment terminal 300 may be configured to perform payment using various manners such as an App card and an NFC card.

The electric vehicle charging adjustment server 400 may be configured to perform adjustment with an electric vehicle charging station on the basis of payment that is performed by the electric vehicle charging payment terminal 300.

The electric vehicle charging adjustment server 400 may be configured to receive electric vehicle charging reservation requests for electric vehicle charging stations and complete the reservations through corresponding electric vehicle charging station terminal 200.

Further, the electric vehicle charging adjustment server 400 may be configured to execute as proxy for an electric vehicle charging payment service through the user terminal 100 or a plastic card, and subtract some of commission for the amount of payment.

Further, the electric vehicle charging adjustment server 400 may be configured to be able to determine an electric vehicle charging price of each electric vehicle charging station through an AI algorithm in consideration of various factors.

The electric vehicle charging adjustment server 400 may be configured to set a real-time dynamic price. The electric vehicle charging adjustment server 400 can set a price to be able to not only secure and maximize the profit of each electric vehicle charging station, but increase satisfaction of users.

The electric vehicle charging adjustment server 400 may be configured to include an electric vehicle charging station database 401, an electric vehicle charging station location analysis module 402, a competing electric vehicle charging station sorting module 403, an electric vehicle position information real-time collection module 404, an electric vehicle path calculation module 405, an electric vehicle path database, an electric vehicle traffic volume calculation module 407, a traffic volume-based electric vehicle charging station location calculation module 408, an electric vehicle charging station-specific charging electricity unit cost real-time checking module 409, a charging electricity unit cost database 410, an electric vehicle charging-necessary situation checking module 411, an electric vehicle charging station-specific charging price database 412, an AI-based electric vehicle charging station-specific real-time price determination module 413, an AI-based electric vehicle charging station-specific real-time price update module 414, an AI-based electric vehicle charging station-specific real-time price transmission module 415, an electric vehicle charging real-time reservation module 416, an electric vehicle charging real-time reservation information storage module 417, an electric vehicle charging real-time reservation information transmission module 418, an electric vehicle charging adjustment module 419, an AI-based electric vehicle charging pattern analysis module 420, and an electric vehicle charging station-specific profit estimation module 421.

Hereafter, the detailed configuration is described.

The electric vehicle charging station database 401 may be configured to storage electric vehicle charging station information. The electric vehicle charging station information may include information such as the brand, the location, the opening hours, the electric vehicle charging type, the number of electric vehicle chargers, the number of electric vehicle chargers that are currently charging, the reservation situation of each electric vehicle charger, the available reservation time of each electric vehicle charger, breakdown information of electric vehicle chargers, whether various subsidiary facilities for convenience for users are available, and whether parking is possible of an electric vehicle charging station. Such electric vehicle charging station information can be updated in real time through the electric vehicle charging station terminal 200.

The electric vehicle charging station location analysis module 402 may be configured to analyze the location of an electric vehicle charging station using the electric vehicle charging station information stored in the electric vehicle charging station database 401. The location of an electric vehicle charging station may be analyzed, for example, on the basis of the traffic volume of surrounding roads, the traffic volume of electric vehicles on the surrounding road, and whether there are competing electric vehicle charging stations within a predetermined radius.

The competing electric vehicle charging station sorting module 403 may be configured to sort competing electric vehicle charging stations on the basis of the analysis result of the electric vehicle charging station location analysis module 402.

The electric vehicle position information real-time collection module 404 may be configured to collect in real time electric vehicle location information from the user terminal 100.

The electric vehicle path calculation module 405 may be configured to calculate an electric vehicle path using the electric vehicle location information collected in real time by the electric vehicle position information real-time collection module 404 and a navigation path.

The electric vehicle path database 406 may be configured to store the electric vehicle path of each electric vehicle calculated by the electric vehicle path calculation module 405. An electric vehicle path may be encoded not to be looked up and then stored in this state and may be decoded and used only for price determination, location analysis, or the like by AI.

The electric vehicle traffic volume calculation module 407 may be configured to calculate in an electric vehicle traffic volume on each electric vehicle path in real time using the electric vehicle location information collected in real time by the electric vehicle position information real-time collection module 404 and the electric vehicle paths stored in the electric vehicle path database 406.

The traffic volume-based electric vehicle charging station location calculation module 408 may be configured to quantify and calculate the location of each electric vehicle charging station on the basis of the electric vehicle traffic volumes on electric vehicle paths calculated in real time by the electric vehicle traffic volume calculation module. That is, the traffic volume-based electric vehicle charging station location calculation module 408 may be configured such that a specific electric vehicle charging station calculates a location by quantifying an electric vehicle traffic volume, etc. of the unit of month or the unit of year for each period. In this case, the traffic volume-based electric vehicle charging station location calculation module 408 may be configured to calculate a traffic volume-based location by dividing a traffic volume quantified for each period by the number of competing electric vehicle charging stations on the same road around.

The electric vehicle charging station-specific charging electricity unit cost real-time checking module 409 may be configured to check in real time a charging electricity unit cost of each electric vehicle charging station. The electric vehicle charging station-specific charging electricity unit cost real-time checking module 409 may be configured to check a charging electricity unit cost through each electric vehicle charging station terminal 200 or a corresponding power supply company. The charging electricity unit cost may depend on hours, a power production source, etc. For example, the charging electricity unit cost may be low late at night and may be relatively low also when electricity is produced by recycling energy sources.

The charging electricity unit cost database 410 may be configured to store the charging electricity unit cost of each electric vehicle charging station checked in real time by the electric vehicle charging station-specific charging electricity unit cost real-time checking module 409.

The electric vehicle charging-necessary situation checking module 411 may be configured to check in real time an electric vehicle charging-necessary situation from the user terminal 100. The electric vehicle charging-necessary situation may be configured such that whether it is an electric vehicle charging-necessary situation or not now in an App installed in the user terminal 100. When it is checked in real time whether the electric vehicle of a user needs to be charged, accuracy can be further increased in adjustment or scheduled recommendation of an electric vehicle charging price.

The electric vehicle charging station-specific charging price database 412 may be configured to store the charging price of each electric vehicle charging station. In the electric vehicle charging station-specific charging price database 412, a current charging price can be stored and an accumulated record can also be stored.

The AI-based electric vehicle charging station-specific real-time price determination module 413 may be configured to determine a real-time charging price of each electric vehicle charging station using an AI algorithm on the basis of the electric vehicle charging station information stored in the electric vehicle charging station database 401, competing electric vehicle charging stations sorted by the competing electric vehicle charging station sorting module 403, the electric vehicle traffic volume on each electric vehicle path calculated in real time by the electric vehicle traffic volume calculation module 407, the charging electricity unit price of each electric vehicle charging station stored in the charging electricity unit cost database 410, the electric vehicle charging-necessary situation checked in real time by the electric vehicle charging-necessary situation checking module 411, and the charging price of each electric vehicle charging station stored in the electric vehicle charging station-specific charging price database 412.

The AI algorithm may be set in various ways, and for example, may be configured to adjust in real time an electric vehicle charging price in consideration of a current electric vehicle traffic volume, the number and reservation time of electric vehicle chargers that are available now for charging of a specific electric vehicle charging station, the number and reservation time of electric vehicle chargers that are available now for charging of competing electric vehicle charging stations, whether the electric vehicles driven around need to be charged. When an available reservation time is remote and there are many electric vehicles that need to be charged, it is possible to automatically set the electric vehicle charging price in real time higher than the current price.

Further, the electric vehicle charging price may be configured to be determined within a price range for securing a fundamental profit fundamentally in accordance with a rise or a drop of the charging electricity unit price.

When receiving the electric vehicle charging price from the electric vehicle charging station terminal 200, the AI-based electric vehicle charging station-specific real-time price determination module 413 can set the received electric vehicle charging price in priority to the electric vehicle charging price determined by the AI algorithm.

If an electric vehicle charging price is manually set, it is possible to reset the electric vehicle charging prices of competing electric vehicle charging stations on the basis of the manually set electric vehicle charging price.

The AI-based electric vehicle charging station-specific real-time price update module 414 may be configured to update and store the real-time charging price of each electric vehicle charging station determined by the AI-based electric vehicle charging station-specific real-time price determination module 413 in the electric vehicle charging station-specific charging price database 412.

The AI-based electric vehicle charging station-specific real-time price transmission module 415 may be configured to transmit the real-time charging price of each electric vehicle charging station determined by the AI-based electric vehicle charging station-specific real-time price determination module 413 to the electric vehicle charging station terminal 200 and the user terminal 100.

The electric vehicle charging station terminal 200 can receive and set the electric vehicle charging station price in the electric vehicle charging payment terminal 300.

The electric vehicle charging real-time reservation module 416 may be configured to make a reservation in real time for electric vehicle charging in accordance with a request from the user terminal 100.

The electric vehicle charging real-time reservation module 416 can create electric vehicle charging real-time reservation information and the electric vehicle charging real-time reservation may include information about an electric vehicle charging station, the ID of an electric vehicle charger, the number of an electric vehicle, an electric vehicle charging price, electric vehicle charging reservation time, etc.

The electric vehicle charging real-time reservation information storage module 417 may be configured to store electric vehicle charging real-time reservation information according to a real-time reservation of the electric vehicle charging real-time reservation module 416.

The electric vehicle charging real-time reservation information transmission module 418 may be configured to transmit in real time the electric vehicle charging real-time reservation information stored in the electric vehicle charging real-time reservation information storage module 417 to a corresponding electric vehicle charging station terminal 200 and a corresponding user terminal 100. In this case, the electric vehicle charging payment terminal 300 may be equipped with a separate camera module (not shown) and may be configured to recognize the number of the electric vehicle ahead of the electric vehicle charging payment terminal 300 through the camera module (not shown) and unlock charging of an electric vehicle charger when a reserved vehicle is confirmed and a charging reservation time is reached. Accordingly, it is possible to prevent charging of another electric vehicle and secure charging for a reserved electric vehicle.

The electric vehicle charging adjustment module 419 may be configured to perform adjustment with an electric vehicle charging station in accordance with payment that is performed by the electric vehicle charging payment terminal 300. The electric vehicle charging adjustment module 419 can take payment commission and execute as proxy for payment for charging of each electric vehicle.

The AI-based electric vehicle charging pattern analysis module 420 may be configured to analyze in real time an electric vehicle charging pattern using an AI algorithm on the basis of an electric vehicle charging station sorted by the competing electric vehicle charging station sorting module 403, the electric vehicle traffic volume on each electric vehicle path calculated in real time by the electric vehicle traffic volume calculation module 407, the electric vehicle path of each electric vehicle stored in the electric vehicle path database 406, the charging price of each electric vehicle charging station stored in the electric vehicle charging station-specific charging price database 412, the charging electricity unit price of each electric vehicle charging station stored in the charging electricity unit cost database 410, the location of each electric vehicle charging station calculated by the traffic volume-based electric vehicle charging station location calculation module 408, and the electric vehicle charging real-time reservation information stored in the electric vehicle charging real-time reservation information storage module 417.

In this configuration, the electric vehicle charging station-specific profit estimation module 421 may be configured to include an electric vehicle charging station-specific pattern analyzer 420*a* and a user-specific pattern analyzer 420*b*.

The electric vehicle charging station-specific pattern analyzer 420*a* may be configured to analyze in real time the charging pattern of an each electric vehicle charging station and the user-specific pattern analyzer 420*b* may be configured to analyze in real time the charging pattern of each user.

For example, the electric vehicle charging station-specific pattern analyzer 420*a* can analyze what type the electric vehicle charging pattern of each electric vehicle charging station is shown in, in accordance with the number of competing electric vehicle charging stations, an electric vehicle traffic volume, a traffic volume-based location, an electric vehicle path, a charging price of each electric vehicle charging station, a charging electricity unit cost, etc. For example, as the electric vehicle traffic volume increases or the competing electric vehicle charging stations decreases, as the electric vehicle charging station price decreases or the gap between the charging electricity unit cost and the electric vehicle charging station price decreases, and as the traffic volume-based location increases, the electric vehicle charging pattern of each electric vehicle charging station can result in more electric vehicle charging reservations. Further, in the opposite situation, an electric vehicle charging pattern in which electric vehicle charging reservations decrease may be shown.

However, when an electric vehicle pattern different from such a general estimation pattern is shown, the electric vehicle charging price may be set wrong, subsidiary facilities may be insufficient, or whether free parking is possible may have a bad influence. That is, when a pattern different from a general estimation pattern is shown, there may be another problem with the corresponding electric vehicle charging station. In this case, reservations may be increased only when the electric vehicle charging price is set lower than those of competing electric vehicle charging stations.

The analysis result of the electric vehicle charging station-specific pattern analyzer 420*a* may be configured to be applied to the AI-based electric vehicle charging station-specific real-time price determination module 413. The AI-based electric vehicle charging station-specific real-time price determination module 413 may be configured to determine the electric vehicle charging price of the corresponding electric vehicle charging station by applying the pattern analysis result.

Meanwhile, the electric vehicle charging station-specific pattern analyzer 420*a* may be configured to analyze the electric vehicle charging pattern for each electric vehicle charging price using an accumulate record of the charging price of each electric vehicle charging station stored in the electric vehicle charging station-specific charging price database 412.

Further, the user-specific pattern analyzer 420*b* can analyze in real time what type the electric vehicle charging pattern of each user is shown in, in accordance with the number of competing electric vehicle charging stations, an electric vehicle traffic volume, a traffic volume-based location, an electric vehicle path, a charging price of each electric vehicle charging station, a charging electricity unit cost, etc. For example, the electric vehicle charging pattern of a user has a high possibility of requesting an electric vehicle reservation when the electric vehicle charging station price decreases, but may request a reservation by making another selection in accordance with subsidiary facilities, whether free parking is possible, whether there is a standby time, etc. regardless of the electric vehicle charging station price. Accordingly, it is possible to determine the electric vehicle charging pattern of each user by continuously analyzing the electric vehicle charging pattern of the users. Such electric vehicle charging pattern of each user can be applied when the AI-based electric vehicle charging station-specific real-time price determination module 413 determines a real-time price of each electric vehicle charging station.

Further, the AI-based electric vehicle charging pattern analysis module 420 may be configured to check the electric vehicle paths stored in the electric vehicle path database 406 for each user, that is, extract a main electric vehicle path of each user that the user frequently use to go to work or go home from worm. Further, the AI-based electric vehicle charging pattern analysis module 420 may be configured to extract all electric vehicle charging stations on a main electric vehicle path of each user. In this case, it may be configured to analyze the pattern about the history of using each electric vehicle charging station when there are several electric vehicle charging stations on a main electric vehicle path. Further, it may be configured to analyze preference of a user by analyzing whether there is an electric vehicle charging station that the user frequently uses through the pattern and by automatically analyzing the differences in price, subsidiary facilities, etc. between the corresponding electric vehicle charging station and other electric vehicle charging stations on the main electric vehicle path. It may be configured to analyze whether the preference of each user is price or subsidiary facilities or whether there is no preference, and provide the analysis result to the corresponding electric vehicle charging station. Each electric vehicle charging station can do business while focusing on the preference of the users of the electric vehicles that pass by the electric vehicle charging station everyday on the basis of an analysis result for the electric vehicle charging station itself.

The electric vehicle charging station-specific profit estimation module 421 may be configured to estimate a profit of each electric vehicle charging station using the electric vehicle charging pattern analyzed in real time by the AI-based electric vehicle charging pattern analysis module 420. The owner of an electric vehicle charging station correspondingly can make business decisions such as expansion of subsidiary facilities, expansion of parking lots, and expansion of electric vehicle chargers.

In particular, the electric vehicle charging station-specific profit estimation module 421 can estimate a profit using the electric vehicle charging pattern analyzed using an accumulate record of the charging price of each electric vehicle charging stations analyzed by the AI-based electric vehicle charging pattern analysis module 420.

The electric vehicle charging station-specific profit estimation module 421 may be configured to estimate a profit of each electric vehicle charging station using the electric vehicle charging pattern analyzed in real time by the AI-based electric vehicle charging pattern analysis module 420.

Although the present disclosure was described above with reference to exemplary embodiments, it should be understood that the present disclosure may be changed and modified in various ways by those skilled in the art, without departing from the spirit and scope of the present disclosure described in claims.

The invention claimed is:

1. An AI-based dynamic pricing system for an electric vehicle charging station, the AI-based dynamic pricing system comprising:

a user terminal being carried by a user who is driving an electric vehicle, the user terminal searching electric vehicle charging stations and making an electric vehicle charging reservation request;

an electric vehicle charging payment terminal performing payment when electric vehicle charging corresponding to the electric vehicle charging reservation request is performed; and an electric vehicle charging adjustment server performing adjustment with the electric vehicle charging station on a basis of payment that is performed in the electric vehicle charging payment terminal, wherein the electric vehicle charging adjustment server comprises at least one processor and a memory storing one or more instructions, wherein the at least one processor, by executing the one or more instructions, is configured to:

collect position information of the electric vehicle from the user terminal;

calculate a driving path of the electric vehicle using the position information that is collected;

calculate a current electric vehicle traffic volume on the driving path of the electric vehicle;

determine a real-time charging price for each electric vehicle charging station using a first AI algorithm based on the current electric vehicle traffic volume;

transmit the real-time charging price to the user terminal and each electric vehicle charging station;

analyze a first charging pattern of each electric vehicle charging station and a second charging pattern of the user using a second AI algorithm; and estimate a profit of each electric vehicle charging station using the first charging pattern and the second charging pattern, and transmit the profit that is estimated to each electric vehicle charging station, wherein the at least one processor is further configured to store the driving path of the electric vehicle in an encoded form such that the driving path is not looked up, and to decode the driving path that is encoded for use by the first AI algorithm and the second AI algorithm, wherein the electric vehicle charging payment terminal comprises a camera, and wherein the electric vehicle charging payment terminal is configured to recognize a vehicle number of the electric vehicle ahead of the electric vehicle charging payment terminal through the camera, and to unlock charging of an electric vehicle charger of the electric vehicle charging station when the electric vehicle ahead of the electric vehicle charging payment terminal is confirmed as a reserved vehicle based on the vehicle number that is recognized and a charging reservation time is reached.

2. The Al-based dynamic pricing system of claim 1, further comprising an electric vehicle charging station terminal looking up and checking an electric vehicle charging reservation at the electric vehicle charging station.

* * * * *